Jan. 2, 1923.
R. L. HEASLIP.
AUTOMOBILE DOOR OPENING AND CLOSING DEVICE.
FILED MAY 8, 1922.
1,440,463
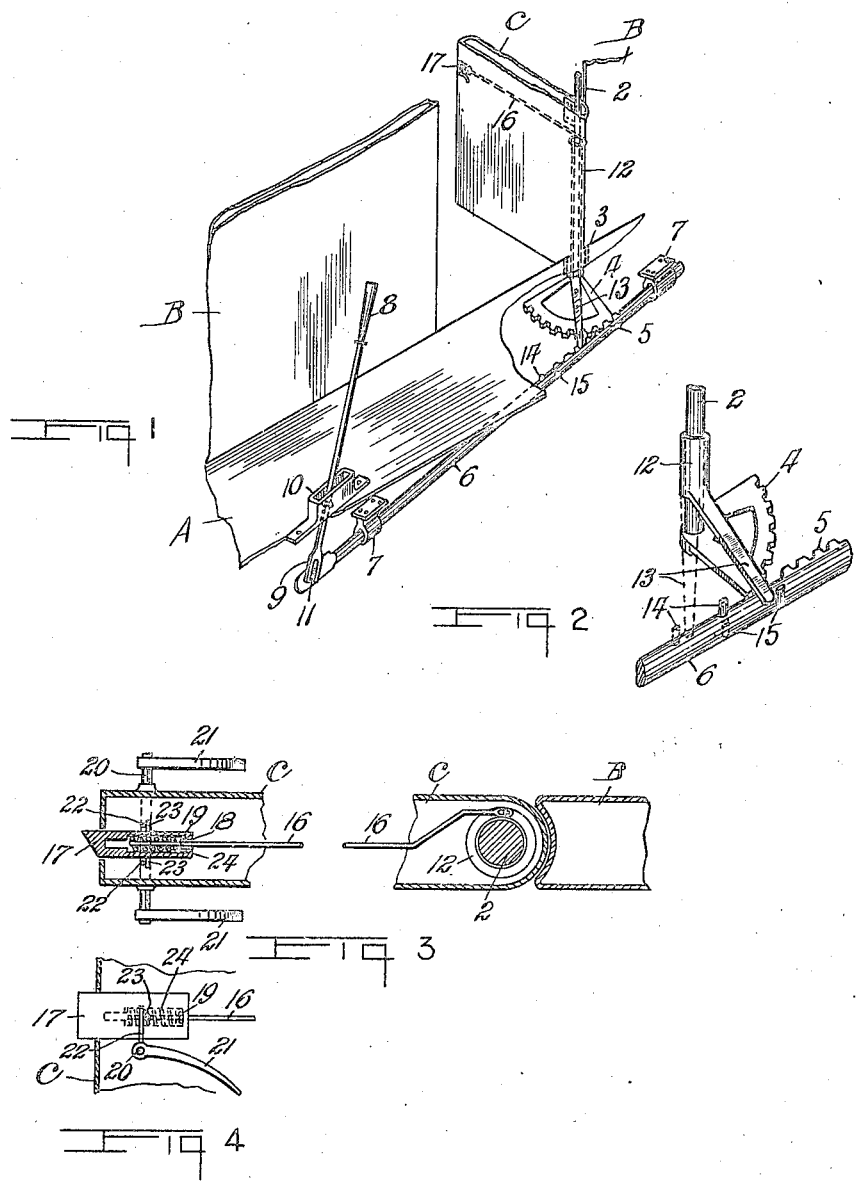
INVENTOR
ROBERT L. HEASLIP
BY
ATTY.

Patented Jan. 2, 1923.

1,440,463

UNITED STATES PATENT OFFICE.

ROBERT L. HEASLIP, OF HAMILTON, ONTARIO, CANADA.

AUTOMOBILE DOOR OPENING AND CLOSING DEVICE.

Application filed May 3, 1922. Serial No. 559,205.

*To all whom it may concern:*

Be it known that ROBERT L. HEASLIP, a subject of the King of Great Britain, residing at Hamilton, in the county of Wentworth and Province of Ontario, Canada, has invented certain new and useful Improvements in Automobile Door Opening and Closing Devices, of which the following is a specification.

My invention relates to improvements in automobile door opening and closing mechanism, and more particularly to a device for opening and closing one of the tonneau doors from the driver's compartment, and consists essentially of a door rigid on a perpendicular rotatable shaft extending below the car flooring and to which beneath the flooring is secured a quadrant gear meshed with a rack slidably operated by a pivoted hand lever.

The principal object of the invention is to provide means in a taxi-cab or chauffeured private car by which one of the tonneau or passenger compartment doors, preferably that on the "curb side" of the car, or both, may be opened and closed by the driver without his leaving driving position.

A further object is to provide means in car door opening and closing mechanism of the class specified which actuate to unlatch the door before opening it and to latch it after closing it.

A still further object is to provide means for opening and closing the door by the passengers independently of the driver or driver's mechanism, by the provision of an ordinary latch control.

Another object is to provide such a device which will be simple, durable, efficient in operation and inexpensive to manufacture.

These, together with other objects which will hereinafter become apparent, may be attained by the construction, combination and arrangement of the parts as will be hereinafter more fully described, illustrated in the accompanying drawing, and pointed out in the claims hereunto appended.

Referring to the drawing:

Figure 1 is a perspective view of the entire device shown as attached to a car, the flooring and curb-side of the car being shown, a portion of which is broken away to reveal the mechanism;

Figure 2 is an enlarged detailed perspective view of the quadrant gear and rack connection;

Figure 3 is a sectional top view of the door; and

Figure 4 is a detailed side elevation of the door latch.

Similar characters of reference refer to similar parts throughout the several views.

In Figure 1 is shown a portion of the flooring A and the curb-side B of a car, the forward seat being removed for an unobstructed view of the mechanism. The right hand or curb door of the tonneau, indicated by C, is rigidly mounted upon the perpendicular rotatable shaft 2 journalled in a bearing 3 secured for example to the bottom of the flooring A.

Rigid on the lower end part of the shaft 2 beneath the flooring A is a quadrant gear 4 adapted to mesh with a rack 5 formed in the rear end part of a draw bar 6 slidably mounted in sleeves 7 secured to the bottom of said flooring.

A hand lever 8, bifurcated at its lower end as indicated by 9, is fulcrumed in a slotted member 10 rigid on the flooring A in the driver's compartment, which slot in said member registers with a corresponding slot in the flooring permitting said lever to extend beneath.

The bifurcations 9 of the lever 8 engage a pin 11 extending horizontally from the forward end of the draw bar 6, as shown in Figure 1.

The perpendicular shaft 2 is provided with a sleeve 12 adapted to independently rotate thereon. The sleeve 12 is provided with a rigid arm 13 arranged at substantially right angles therewith at its lower end part, and projecting to a point between two pins 14 and 15 rigid on the draw bar 6, and adapted to contact with either one or the other depending on whether said draw bar is moved forward or backward.

The upper end of the sleeve 12 has eccentric pivotal connection with a rod 16 whose opposite end is connected to the sliding door latch 17. The rod 16, which is confined within the door C, enters the hollow latch 17 through a hole 18 in its rear end, and a nut 19 is threaded on the end of said rod against the interior of the latch.

When it is desired to open the door C the draw bar 6 is slightly moved in a forwardly direction by rearward pressure upon the handle of the hand lever 8. This action causes the pin 15 to engage the end of the arm 13 which rotates the sleeve 12 clockwise, consequently withdrawing the latch 17 from its socket. Thus the first action in opening the door is completed. By continuation of the rearward pressure effected upon the hand lever 8 the rack 5 begins to mesh with the quadrant gear 4, and with such pressure continued the door may be swung open to its entire limit.

To bring the door to a closed position the direction upon the hand lever 8 is reversed. When the door is fully closed, and the rack 5 demeshed with the quadrant gear 4, the backward movement of the draw bar 6 is continued. The pin 14 engages the opposite edge of the arm 13 with the result of re-latching the door.

It may be sometimes desirable for the passengers to open and close the door of their own accord. For this purpose I provide the customary mechanism which may be operated independently, and comprises a horizontally disposed rocker shaft 20 journalled in the door immediately below the latch 17, the ends of which shaft may be provided with suitable grips 21 for rotating it. Rigid on the shaft 20 are normally perpendicularly disposed pins 22 engaging lateral horizontal pins 23 rigid on the latch 17.

By rotating the shaft 20 clockwise the latch is withdrawn from its socket, and a spring 24 is provided for returning the latch to normal position when the grips 21 are released.

It will be observed that a duplicate device may be provided to open and close the other tonneau door, which may be operated simultaneously by the same hand lever, or be operated independently as desired.

Having now fully described my invention, what I claim and desire to secure by Letters Patent, is:—

1. In automobile tonneau door opening and closing mechanism, a perpendicularly disposed rotatable shaft, a tonneau door rigidly mounted on the shaft, a draw bar slidably mounted beneath the floor of the automobile, a rack integral with said draw bar, a gear rigid on said shaft and adapted to mesh with said rack, a sleeve independently rotatable around said shaft, an arm integral with said sleeve extending to said draw bar, a pin rigid on said draw bar adapted to engage said arm when the draw bar moves forwardly, a second pin rigid on said draw bar adapted to engage said arm when the draw bar moves backwardly, a slidable door latch, and a rod connected to said latch and eccentrically pivoted at its opposite end to said sleeve.

2. In automobile tonneau door opening and closing mechanism, a perpendicularly disposed rotatable shaft, a tonneau door rigidly mounted on the shaft, a draw bar slidably mounted beneath the floor of the automobile, a rack integral with said draw bar, a gear rigid on said shaft and adapted to mesh with said rack, a sleeve independently rotatable around said shaft, an arm integral with said sleeve extending to said draw bar, a pin rigid on said draw bar adapted to engage said arm when the draw bar moves forwardly, a second pin rigid on said draw bar adapted to engage said arm when the draw bar moves backwardly, a slidable door latch, a rod connected to said latch and eccentrically pivoted at its opposite end to said sleeve, and means for operating said latch independently of the movement of said rod.

In testimony whereof I have affixed my signature.

ROBERT L. HEASLIP.

Witnesses:
H. G. HENDRY,
V. D. EARLE.